Nov. 19, 1957  N. S. HOYER  2,813,808
PROCESS FOR IMPROVING HOMOGENEITY OF SILVER
OR COPPER REFACTORY CONTACT MATERIALS
Filed April 4, 1955
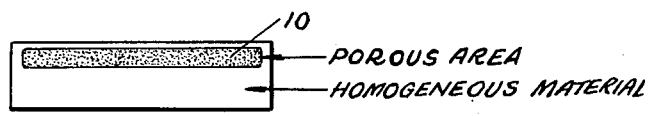
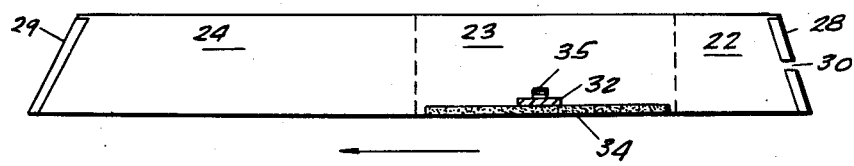
INVENTOR.
NORMAN S. HOYER
BY
ATTORNEYS

United States Patent Office 2,813,808
Patented Nov. 19, 1957

2,813,808

PROCESS FOR IMPROVING HOMOGENEITY OF SILVER OR COPPER REFRACTORY CONTACT MATERIALS

Norman S. Hoyer, Pittsburgh, Pa., assignor to Gibson Electric Company, Pittsburgh, Pa., a corporation of Pennsylvania Application April 4, 1955, Serial No. 498,805

8 Claims. (Cl. 117—227)

My invention relates to a novel method for infiltrating a pressed and sintered refractory compact with a lower melting point metal and more particularly to a method of infiltrating a refractory compact with an electrically conductive metal so as to provide an improved electrical contact.

In the manufacture of electrical contacts it is the practice to compact a refractory material such as tungsten, molybdenum or their carbides and then to infiltrate therein a conducting metal such as silver or copper.

Generally, infiltrating consists of the absorption of a liquid metal by a porous body. The porous body initially in powder form is pressed or briquetted into a shaped mass containing a required percent of porosity. The porous body in this instance is either a refractory metal such as tungsten, tungsten carbide or molybdenum, or a composite of these refractory metals and one or more lower melting point metals, such as silver or copper. For composite compositions prior to infiltration, the porous body is generally sintered at a temperature somewhat above the melting point of the lowest melting point constitutent. The infiltrating temperature is at or above the melting point of the infiltrant and a time between one to thirty minutes generally is required for complete permeation of the porous body. In most cases the infiltrant in solid form is placed onto the porous body or compact as it is sometimes called. Therefore, the infiltration proceeds in a downward direction aided both by capillary action and gravity.

One method of infiltrating the conducting metal is to melt a slug of such metal as it rests on the compacted refractory material at which time the molten metal will fill up the pores between the refractory particles. After a suitable infiltration time the compact is then rapidly cooled. This method of infiltrating is apparently quite satisfactory in cases where thin compacts, about 0.1 inch in thickness are concerned. However, in thicker compacts, inconsistencies in homogeneity results.

This inhomogeneity produces an area of porosity or unwetted refractory which not only requires the infiltration of excess silver into the compact, but results in a product of poorer physical and electrical properties.

Accordingly, it is an object of my invention to provide a method of producing a homogeneous electrical contact more than 0.1 inch thick and which comprises a refractory metal and a conducting metal.

Another object of my invention is to provide for a method of infiltrating and subsequently cooling a pressed and sintered powdered refractory material so that the resulting refractory product is completely homogeneous.

Still another object of my invention is to provide a method for cooling a pressed and sintered refractory material at a cooling rate so that the resulting composite is completely homogeneous and thereby enhancing both its physical and electrical characteristics.

These and other objects of my invention will become more apparent when taken in connection with the following description of the drawings in which:

Figure 1 illustrates the inhomogeneity and results in refractory compacts of electrical contacts made therefrom under the methods of the prior art in which the infiltrating metal is rapidly cooled.

Figure 2 shows a method and apparatus of carrying out my invention whereby a compacted refractory material is infiltrated with a lower melting point metal and cooled at a controlled rate to a point below the melting point of the infiltrant in order to provide a compact which will be thicker than 0.1 inch and yet be completely homogeneous.

Essentially, my invention involves a matter of infiltrating a pressed and sintered powdered refractory compact with a lower melting point metal which comprises placing the infiltrating metal on the said refractory in a reducing atmosphere, melting the said infiltrant and cooling the entire mass at a rate less than 10° F. per minute to a temperature below the melting point of the infiltrant. When this point is reached, subsequent cooling may proceed at any desired rate.

Referring to Figure 1 which illustrates the cross section of a fractured compact which has been infiltrated with a conducting metal and rapidly cooled, it can be seen that there is a darkened area of inhomogeneity which is easily distinguished from the lighter homogeneous portion of the structure. This inhomogeneity area is actually an area of porosity or unwetted refractory.

When the compact is heated, the gases expand and begin percolating out of the compact. However, not all of the occluded gases succeed in being released from the compact due to the enclosed voids wherein some of the gases cannot escape and the fact that the composite material, after infiltration, is cooled too rapidly sealing off the remainder of the occluded gases. These captured or occluded gases, e. g. hydrogen when using a hydrogen atmosphere in the sintering process, are apparently responsible for this porous darkened area 10 in Figure 1. Moreover, the shrinkage occurring on cooling results in uneven distribution of the infiltrant which, because of its surface tension, collects together away from the cooling surface.

Although the lighter area is homogeneous in nature the compact is not only weakened by the porous area 10 but the electrical properties of such a compact when used as an electrical contact are also seriously impaired. The contact will have points of varying resistance and therefore, will heat up unevenly when an electrical current is passed through the contact.

My invention involves a process whereby homogeneous structures may be obtained in thick compacts, that is more than 0.1 inch in thickness, by placing a slug of the infiltrating metal on the compacted and sintered refractory material, melting the infiltrant and then, after it has flowed into the compact, slowly cooling the molten infiltrant to a point where it solidifies. The slow cooling allows the infiltrant to squeeze any occluded or absorbed gases by maintaining a molten metal reservoir which will fill in any pores caused by shrinkage and thereby force out occluded gases which may be present in the compact. This minimizes the entrapment of such gases and provides for a more homogeneous final structure.

I have found that in the process of making electrical contacts comprised of pressed and sintered refractory material and infiltrated with silver or copper that by cooling the molten infiltrating metal at a rate under 10° F. per minute, a homogeneous cross section is obtained even in contacts up to a thickness of 0.3 inch. For economy reasons, I prefer to cool at a rate greater than 5° F. per minute, so that a cooling rate of between 5° and 10° F. per minute is preferred. Of course, my process is applicable to thinner compacts below 1/16 of an inch thick but here the improvement over the method of rapid cooling is not so readily apparent, because in thinner compacts the occluded and absorbed gases have comparatively short distances to travel and therefore, no difficulty is encountered in escaping during the cooling of the compacts.

Referring now to Figure 2 and to a specific example of my novel process I have used an electric furnace having three chambers which provide a pre-heat zone 22, a hot zone 23 and a cooling chamber 24. The hot zone temperature is maintained at about 2,350° F. although obviously this temperature may vary depending on the melting point of the infiltrant.

In this specific example, silver was used as the infiltrant so that the hot zone temperature provided about a 600° F. differential over the melting point of silver, i. e. 1,760° F. An atmosphere of pure dry hydrogen is maintained in the furnace and the temperature of the pre-heat zone is kept between 400° and 500° F. while that of the cooling chamber is between 200° and 300° F. There are two doors 28, and 29 at the pre-heat and cooling end of the furnace, respectively. These doors are kept closed except when compacts are put in or taken out of the furnace. A small hole 30 of approximately ¾ of an inch in diameter is located in the center of the pre-heat door. This is the so called burn off end where the hydrogen passes through the furnace, escapes and is burned off. The pressed and sintered refractory compacts 32 which may be of tungsten, tungsten carbide, molybdenum or molybdenum carbide are placed on carbon boat 34. A slug of silver 35 is placed on the compact which is then stoked through the furnace at a rate of about 1 inch per minute. It is further found that this rate allows the molten infiltrated compact to cool at a rate of about 7° F. per minute.

It was found in following this procedure that the macro-structures of the resulting electrical contact are all fine grained and homogeneous. In the case of silver they are white throughout without any darkened area and in the case of copper are colored by the infiltrated copper.

The compacts may be sent thru the furnace either on a continuously moving belt which will travel at a rate so that the cooling takes place between 5° and 10° F. per minute or by hand stoking so that this cooling rate is maintained. In Figure 2, the direction of movement of the compact is shown as right to left. I have found that when cooling contacts rapidly in excess of 100° F. per minute the excess silver solidifies as dendritic crystals whereas when the cooling rate is maintained below 10° F. per minute there is no apparent indication of crystallization. It has further been found that any excess silver covers a larger area of the surface of the compact in the case of slow cooling which indicates the increased wetability of the refractory by the silver due to the expulsion of the occluded gases hereinbefore referred to.

The presence of a reducing atmosphere such as dry hydrogen or dissociated ammonia in the furnace is essential because in my process I am not only concerned with eliminating occluded and absorbed gases, but also with preventing oxidation or the refractory during infiltration, as the oxides would tend to decrease the wetability of the refractory. Therefore, an oxygen free atmosphere is essential.

It should also be understood that any type of furnace utilizing a reducing atmosphere in which the compacts may be transported horizontally at the desired rate and thereby maintaining the desired critical cooling rate would be satisfactory.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. The method of infiltrating a pressed and sintered powder refractory compact having a thickness greater than 1/16 inch, with silver which comprises placing a slug of silver on the said refractory in a reducing atmosphere, thoroughly melting the silver by heating the composite between 2000° F. and 2500° F., and cooling the entire mass at a rate below 10° F. per minute to a temperature below 1,760° F.

2. The method of making an electrical contact containing a pressed and sintered refractory material impregnated with a conducting metal which comprises placing the impregnating metal on the said refractory in a reducing atmosphere, melting the said impregnating metal by heating the composite of impregnating and refractory material to a temperature at least 240° F. above the melting point of the impregnating material, and slowly cooling the entire mass at a rate of from 5° to 10° F. per minute to a temperature below the melting point of the said impregnating metal.

3. The method of making an electrical contact containing a pressed and sintered refractory material from the group consisting of tungsten, molybdenum and their carbides with silver which comprises placing a slug of silver on the said refractory in a reducing atmosphere, melting the silver by heating the silver-refractory composite to between 2000° F. and 2500° F., and cooling the entire mass at a rate between 5° to 10° F. per minute to a temperature below the melting point of the said silver.

4. The method of making an electrical contact having a thickness greater than 1/16 of an inch containing a pressed and sintered refractory material impregnated with a conducting metal which comprises placing the impregnating metal on the said refractory in a reducing atmosphere, melting the said impregnating metal by heating the composite of impregnating and refractory material to a temperature at least 240° F. above the melting point of the impregnating material, and slowly cooling the entire mass at a rate of from 5° to 10° F. per minute to a temperature below the melting point of the said impregnating metal.

5. The method of making an electrical contact of between 1/16 and 0.3 inch thickness containing a pressed and sintered refractory material from the group consisting of tungsten, molybdenum and their carbides with silver which comprises placing a slug of silver on the said refractory in a hydrogen atmosphere heating the mass to a temperature between 2000° and 2500° F., thereby melting the silver, and cooling the entire mass at a rate between 5° and 10° F. per minute to a temperature below the melting point of the said silver.

6. The method of claim 5 in which the mass is heated to about 2350° F.

7. The method of infiltrating a pressed and sintered powder refractory compact having a thickness greater than 1/16 inch with a lower melting point metal which comprises placing the infiltrating metal on the said refractory in a reducing atmosphere, melting the said infiltrant by heating the composite of infiltration and refractory material to a temperature at least 240° F. above the melting point of the infiltrating metal, and cooling the entire mass at a rate below 10° F. per minute to a temperature below the melting point of the said infiltrant.

8. The method of claim 7 in which the composite is heated to about 600° F. above the melting point of the infiltrating metal.

References Cited in the file of this patent
UNITED STATES PATENTS

| | | |
|---|---|---|
| 2,401,221 | Bourne | May 28, 1946 |
| 2,561,579 | Lenel | July 24, 1951 |
| 2,671,955 | Grubel | Mar. 16, 1954 |
| 2,706,694 | Haller | Apr. 19, 1955 |